(12) United States Patent
Zhong et al.

(10) Patent No.: US 11,244,203 B2
(45) Date of Patent: Feb. 8, 2022

(54) AUTOMATED GENERATION OF STRUCTURED TRAINING DATA FROM UNSTRUCTURED DOCUMENTS

(71) Applicant: International Business Machines Corporation, Armonk, NY (US)

(72) Inventors: Peter Zhong, Vermont (AU); Antonio Jose Jimeno Yepes, Melbourne (AU); Jianbin Tang, Doncaster East (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 16/784,726

(22) Filed: Feb. 7, 2020

(65) Prior Publication Data
US 2021/0248420 A1 Aug. 12, 2021

(51) Int. Cl.
*G06K 9/62* (2006.01)
*G06F 16/332* (2019.01)
(Continued)

(52) U.S. Cl.
CPC ....... *G06K 9/6259* (2013.01); *G06F 16/3329* (2019.01); *G06F 16/355* (2019.01);
(Continued)

(58) Field of Classification Search
CPC .. G06K 9/6259; G06K 9/3233; G06K 9/6201; G06K 9/6218; G06K 9/6267; G06K 9/6256; G06K 9/6273; G06K 9/00463; G06F 16/3329; G06F 16/355; G06F 16/93; G06F 40/205; G06F 40/143;
(Continued)

(56) References Cited

U.S. PATENT DOCUMENTS 5,784,487 A * 7/1998 Cooperman ....... G06K 9/00469
  382/112
6,463,433 B1 * 10/2002 Baclawski .......... G06F 16/9014
(Continued)

OTHER PUBLICATIONS

Zhong et al., "PubLayNet: largest dataset ever for document layout analysis," eprint arXiv: 1908.07836, Aug. 2019, 8 pages.

*Primary Examiner* — Mahendra R Patel
(74) *Attorney, Agent, or Firm* — Cantor Colburn LLP; Joseph Petrokaitis

(57) ABSTRACT

Methods, systems and computer program products for automatically generating structured training data based on an unstructured document are provided. Aspects include receiving an unstructured document and a corresponding structured document that includes labeled portions. Aspects also include generating a parsed document that has one or more extracted objects by applying a parsing tool to the unstructured document. Aspects also include identifying one or more matching extracted objects by applying a matching algorithm to the structured document and the parsed document. Each matching extracted object is an extracted object of the parsed document that corresponds to a labeled portion of the structured document. Aspects also include annotating a region of the unstructured document that corresponds to the bounding box of the respective matching extracted object with a respective label of the corresponding labeled portion of the unstructured document.

20 Claims, 12 Drawing Sheets

(51) Int. Cl.
*G06F 16/35* (2019.01)
*G06F 40/205* (2020.01)
*G06K 9/32* (2006.01)
*G06F 16/93* (2019.01)

(52) U.S. Cl.
CPC ............ *G06F 16/93* (2019.01); *G06F 40/205* (2020.01); *G06K 9/3233* (2013.01); *G06K 9/6201* (2013.01); *G06K 9/6218* (2013.01); *G06K 9/6267* (2013.01)

(58) Field of Classification Search
CPC .... G06F 16/2428; G06F 16/9014; G06F 3/00; G06F 3/048; G06F 8/31
USPC ........................................................ 382/159
See application file for complete search history.

(56) References Cited

U.S. PATENT DOCUMENTS

| | | | | |
|---|---|---|---|---|
| 7,013,309 | B2* | 3/2006 | Chakraborty | G06F 40/30 |
| 7,496,892 | B2* | 2/2009 | Nuss | G06F 8/31 |
| | | | | 709/200 |
| 7,536,413 | B1* | 5/2009 | Mohan | G06F 16/355 |
| 8,892,579 | B2* | 11/2014 | Pareek | G06F 16/93 |
| | | | | 707/755 |
| 9,110,882 | B2* | 8/2015 | Overell | G06F 40/295 |
| RE46,973 | E* | 7/2018 | Mohan | G06F 16/34 |
| 10,361,802 | B1* | 7/2019 | Hoffberg-Borghesani | |
| | | | | G11B 27/11 |
| 10,599,924 | B2* | 3/2020 | Yang | G06K 9/34 |
| 10,839,245 | B1* | 11/2020 | Dhillon | G06K 9/46 |
| 2007/0140566 | A1* | 6/2007 | Lin | G06K 9/00449 |
| | | | | 382/203 |
| 2008/0263032 | A1* | 10/2008 | Vailaya | G06F 16/334 |
| 2012/0310868 | A1* | 12/2012 | Martins | G06F 16/313 |
| | | | | 706/12 |
| 2013/0205200 | A1* | 8/2013 | Lazarevic | G06K 9/342 |
| | | | | 715/244 |
| 2016/0055376 | A1* | 2/2016 | Koduru | G06K 9/4604 |
| | | | | 382/176 |
| 2016/0162645 | A1* | 6/2016 | Bornhorst | G16H 70/20 |
| | | | | 705/3 |
| 2016/0314104 | A1* | 10/2016 | Phillips | G06F 16/9558 |
| 2017/0147540 | A1* | 5/2017 | McCormick | G06F 40/174 |
| 2017/0329749 | A1* | 11/2017 | Milward | G06F 40/166 |
| 2019/0122043 | A1* | 4/2019 | Bala | G06K 9/344 |
| 2020/0193222 | A1* | 6/2020 | Singh | G06K 9/6255 |
| 2020/0327674 | A1* | 10/2020 | Yang | G06T 7/13 |
| 2021/0142356 | A1* | 5/2021 | Samanta | G06K 9/00463 |

* cited by examiner

AUTOMATED GENERATION OF STRUCTURED TRAINING DATA FROM UNSTRUCTURED DOCUMENTS

BACKGROUND

The present invention generally relates to processing systems, and more specifically, to providing automated generation of structured training data from unstructured documents.

Trained machine learning models can be used for object recognition applications, provided sufficient training data is available to properly train the model. In published literature, vital information is often contained in tables included in the document. This is particularly true of medical literature, such as clinical studies, in which much of the information about results across different groups is contained only in these tables and is not present in the remaining text.

SUMMARY

Embodiments of the present invention are directed to automated generation of structured training data from unstructured documents. A non-limiting example of the computer-implemented method includes receiving an unstructured document and a corresponding structured document. The structured document includes a plurality of labeled portions. Each labeled portion is associated with a label that classifies the respective labeled portion as being one of a plurality of element types. The method also includes generating a parsed document by applying a parsing tool to the unstructured document. A parsed document includes one or more extracted objects. Each extracted object has a bounding box that corresponds to a region of the unstructured document within which the extracted object is positioned and each extracted object is one of a textbox, an image location and a geometric shape. The method also includes identifying one or more matching extracted objects by applying a matching algorithm to the structured document and the parsed document. Each matching extracted object includes an extracted object of the parsed document that corresponds to a labeled portion of the structured document. The method also includes, for each of the one or more matching extracted objects, annotating a region of the unstructured document that corresponds to the bounding box of the respective matching extracted object with a respective label of the corresponding labeled portion of the unstructured document.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a representation of a portion of a structured document according to one or more embodiments of the present invention;

FIG. 7 depicts an example annotation process of an unstructured document according to one or more embodiments of the present invention;

Figure 1:
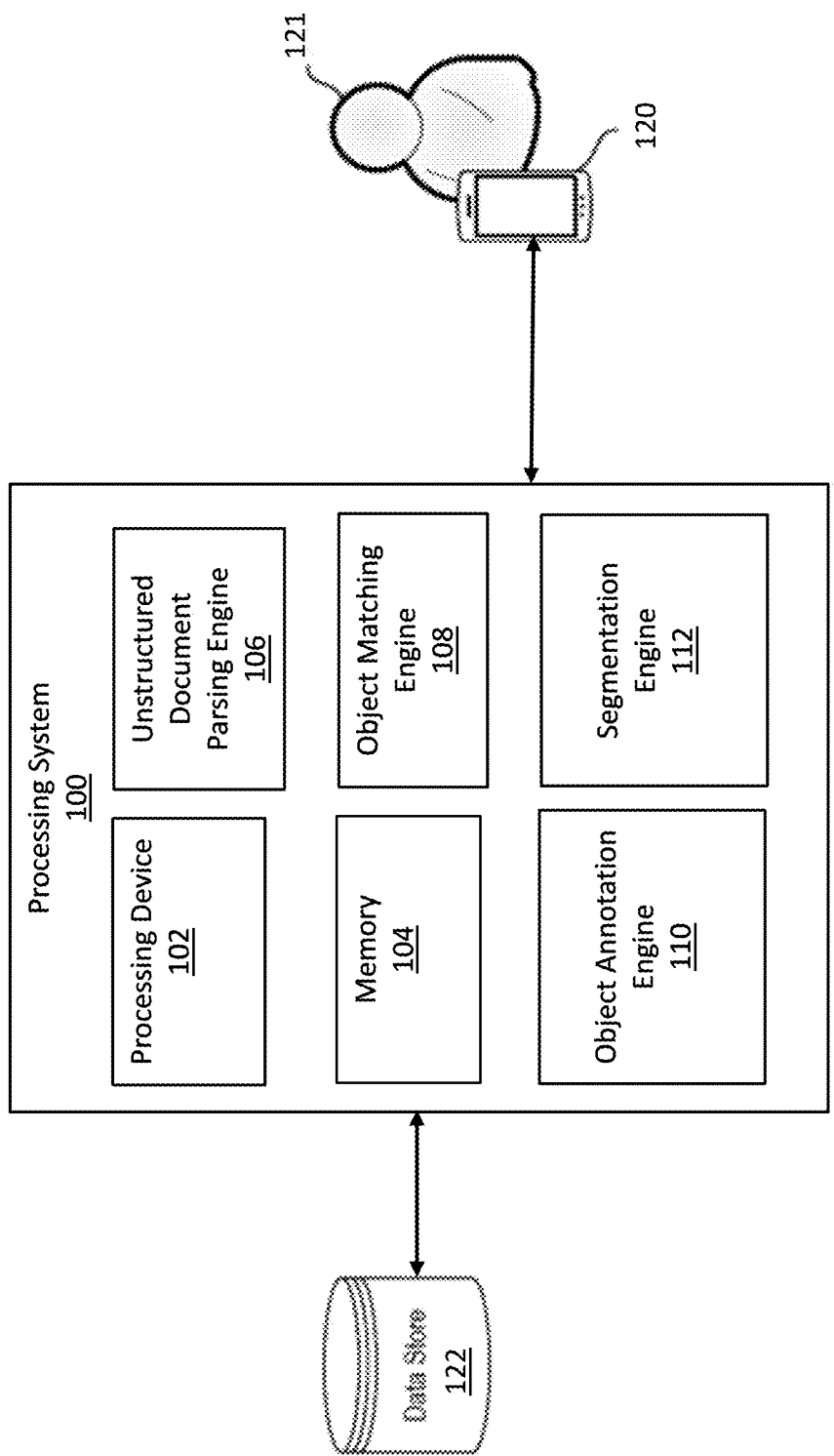
FIG. 1 depicts a system upon which automated generation of training data from unstructured documents can be implemented according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Documents in Portable Document Format (PDF) are ubiquitous with approximately 2.5 trillion documents available in this format. While these documents are convenient for human consumption, automatic processing of these documents is difficult because understanding document layout and extracting information using this format is complicated.

Geometric layout analysis techniques based on an image representation of the document combined with optical character recognition (OCR) methods have been used to attempt to understand these documents, but these methods fail to adequately recognize or extract data in various document elements, such as tables. Image analytics methods based on deep learning are becoming available and can be used to train document layout understanding pipelines, but training of such models requires a large amount of training data to be successful. Conventionally this has been a difficult task because due to the complex nature of document layouts and elements, it has required humans to manually review and annotate the PDF documents to label the document elements. This task is made even more challenging by virtue of the fact that there are a large variety of different document layouts, which greatly increases the number of documents that are required to be annotated to be used as training data. Manual annotation is a slow and expensive process and these limitations will tend to result in much smaller numbers of annotated PDFs being available as training data, thereby resulting in the creation of less robust and less accurate machine learning models for extracting elements of new documents.

Turning now to an overview of the aspects of the invention, one or more embodiments of the invention address the above-described shortcomings of the prior art by providing novel computer-implemented techniques for providing automated generation of structured training data from unstructured documents. For example, embodiments of the invention can be used to automatically create a large set of annotated PDF documents based on a set of unlabeled PDF documents and a corresponding set of structured documents, such as Extensible Markup Language (XML) files. For example, the PubMed Central™ database includes over 1 million PDF articles and corresponding XML documents that can be used by embodiments of the present invention to automatically generate annotated PDF documents. Each PDF and XML document pair represent the same general information in different formats, with the PDF being a format designed to be easily consumed by a human reader and the XML format being a structured format including labels that identify that various elements (e.g., paragraphs, images, tables, etc.) of the document. Each annotated PDF document can be automatically labeled such that the various elements (e.g., sentences, paragraphs, titles, images, tables, headers, footers and the like) of a page layout can be accurately identified and labeled. The large resultant set of annotated PDF documents can then be used as training data to effectively train a machine learning model to analyze new documents and identify and extract layout elements from the new documents. In this way, a machine learning model trained using the training data created by embodiments of the present invention can, for example, accurately identify and extract otherwise difficult elements to extract (such as tables) from a new, unlabeled PDF document. Deep neural networks that are developed for computer vision can be an effective method to analyze layout of document images. However, deep neural networks need to be trained with a very large number of diverse samples to avoid overfitting and to be able to generalize to unseen examples. Hence, to train a robust and accurate deep neural network model for document layout analysis, it is common for over 100,000 training samples of diverse document style and template to be required. Each training sample must be accurately annotated with bounding boxes and segmentations, each of which belongs to a category. Manual annotation of samples is extremely labor-intensive and time-consuming, and it is therefore generally infeasible to obtain such large-scale high-quality data using brute-force human labor. When only limited training data is available, deep neural networks tend to overfit (i.e., fail on unseen document styles), and become less-robust (i.e., sensitive to adversarial attacks). This makes them unreliable to be used in commercial setting. Furthermore, manual annotation may be prone to errors in labeling and in accurate and/or inexact bounding of objects/elements within a document, leading to lower quality training data, which can result in less robust models.

According to some embodiments of the invention, the novel techniques include labeling a large amount of PDF documents that do not initially have any delineation or labels specified by parsing the PDF and then matching unlabeled portions of the parsed PDF to labeled portions of the XML document. It should be understood that although the present disclosure generally uses PDF and XML documents as examples of unstructured and structured documents utilized by the disclosed system to automatically generate training data, it is contemplated that in various embodiments of the invention, any other suitable type of unstructured and/or structured documents can alternatively be used. For example, other types of unstructured documents can include scanned documents, and plain text (tables, lists, and simple images can be constructed by spatially arrange characters and symbols in a way that is perceivable by humans); and other types of structured documents can include LaTeX, mark-down, JavaScript Object Notation (JSON), word processing documents, and Hypertext Markup Language (HTML). Embodiments of the invention can further include pre-processing of the parsed PDF and XML documents to normalize the formatting of the documents prior to applying a matching algorithm to match portions of the documents to one another. The novel techniques disclosed herein further include providing an automated quality control process that discards partially annotated PDFs from the training data set, as well as a segmentation process that more precisely defines the boundaries of document elements/objects to provide for more precise document annotations. These novel techniques provide technical advantages of providing automated classification of objects in unstructured documents on a very large scale that enables the creation of machine learning models to then automatically classify objects in newly presented unstructured documents that do not have corresponding structured documents from which to infer a structure. This can be particularly useful in enabling the automatic identification of tables within a large variety of documents, which has traditionally been a technical challenge to automate by rule-based systems.

Turning now to a more detailed description of aspects of the present invention, FIG. 1 depicts a system 100 for providing of automated generation of training data from unstructured documents is generally shown in accordance with one or more embodiments of the present invention. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

The processing system 100 includes the processing device 102, the memory 104, an unstructured document parsing engine 106 for generating a parsed document from an unstructured document, an object matching engine 108 for matching labeled portions of a structured document to portions of the parsed document, an object annotation engine 110 for annotating portions of an unstructured document with labels and a segmentation engine 112 for more precisely defining the boundaries of the annotated portions of an unstructured document. The processing system 100 can be configured to communicate with a user device 120, which may display data to and receive user inputs from a user 121. In some embodiments, user device 120 can be used to execute trained models, such as neural network classification models, based on training data automatically generated by processing system 100 as described herein. In some embodiments, the training data generated by processing system 100 can be a plurality of documents, such as for example, research papers in Portable Document Format (PDF) that have been annotated by the processing system 100 to label various objects or elements on each page of the documents, such as text (e.g., sentences, paragraphs, captions, etc.), images, tables, charts, titles, headers, footers and other such common document features, as well as defining boundaries around each labeled object. As will be understood by those of skill in the art, such annotated documents can be used as training data to train a machine learning model to perform a task of identifying objects in new, previously unseen documents. According to some embodiments, the disclosed techniques can be used to relatively quickly generate thousands, tens of thousands, hundreds of thousands or even millions of such documents for use as training data. According to some embodiments, the processing system 100 can communicate with user device 120 and/or data store 122 via communications network that can be one or more of, or a combination of, public (e.g., Internet), private (e.g., local area network, wide area network, virtual private network), and can include wireless and wireline transmission systems (e.g., satellite, cellular network, terrestrial networks, etc.). In exemplary embodiments, user device 120 can be, but is not limited to, a server, a desktop computer, a laptop, a tablet, a smartphone, a tablet, a computer system such as the one shown in FIG. 12, or any other suitable electronic device that can be used for training and/or executing machine learning models. The processing system can store and access data via a connected data store 122. For example, in some embodiments, data store 122 can be a repository of structured and unstructured documents that can be used by processing system 100 to generate training data as described herein. In some embodiments, data store can 122 store a plurality of structured documents (e.g., Extensible Markup Language (XML) files) and corresponding plurality of unstructured documents (PDF documents) in which each pair of corresponding documents generally represent the same information in two different forms (e.g., the same research paper presented in two different formats). For example, in some embodiments, data store 122 can be one or more databases of stored documents, such as PubMed Central Open Access, which provides over a million publications in both PDF and XML formats.

Figure 2:
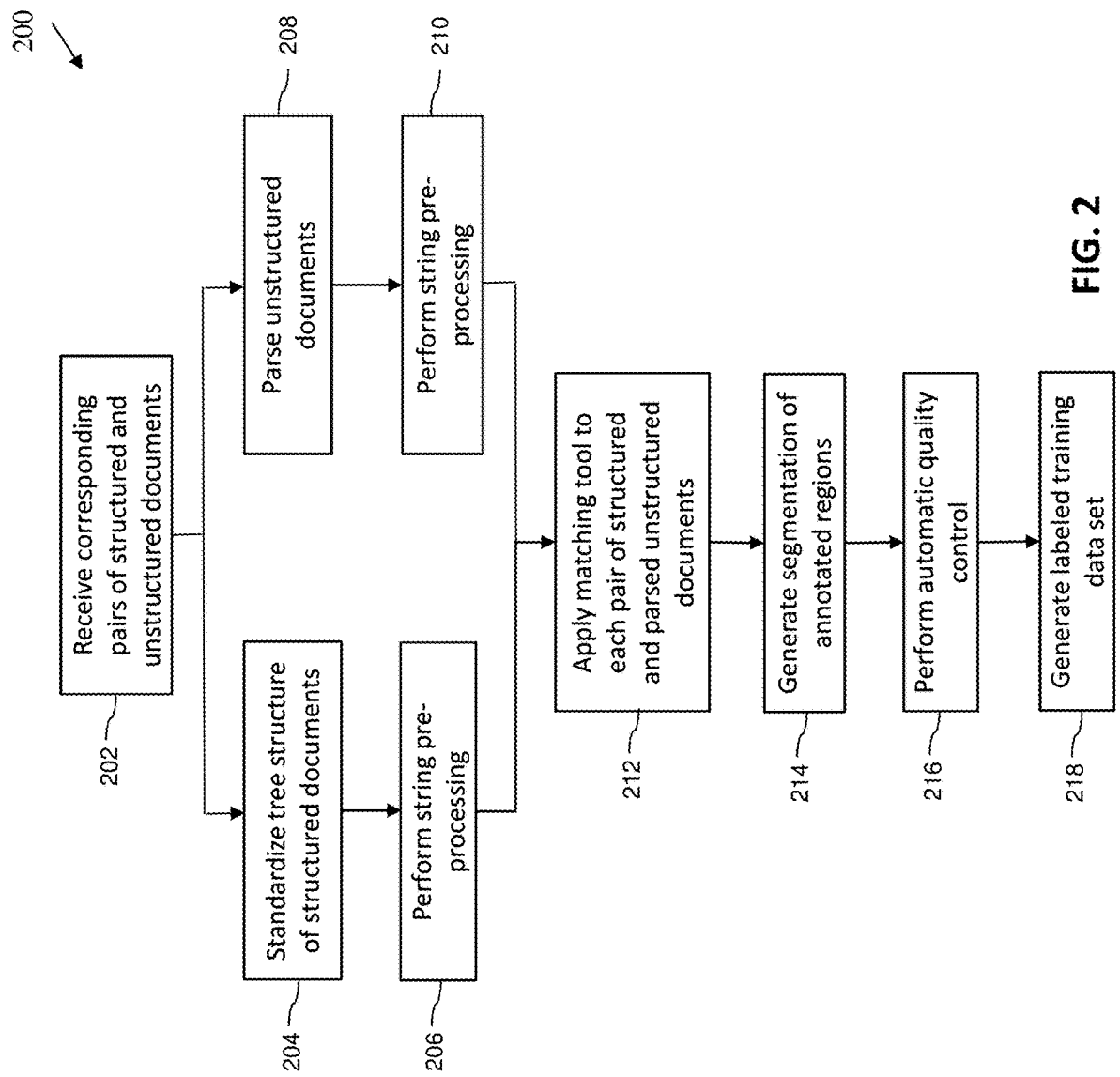
FIG. 2 illustrates a flow diagram for a process of automated generation of structured training data from unstructured documents in accordance with one or more embodiments of the present invention.

Turning now to FIG. 2, a flow diagram of a method 200 for providing automated generation of structured training data from unstructured documents in accordance with an embodiment is shown. In one or more embodiments of the present invention, the method 200 may be embodied in software that is executed by processing system 100 and/or by computer elements located within a network that may reside in the cloud, such as the cloud computing environment 50 described herein above and illustrated in FIGS. 10 and 11. In other embodiments, the computer elements may reside on a computer system or processing system, such as the processing system 1200 described herein above and illustrated in FIG. 12, or in some other type of computing or processing environment.

Figure 3:
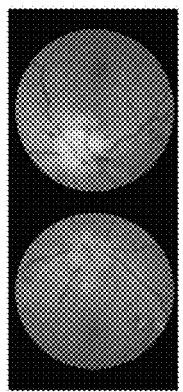
FIG. 3 depicts a page of an example unstructured document according to one or more embodiments of the present invention.

The method 200 begins at block 202 and includes receiving (e.g., via processing system 100) corresponding pairs of structured and unstructured documents. For example, processing system 100 can access a database (e.g., data store 122) of documents, such as the PubMed Central™ database or other such suitable database that includes publications that are both in form of unstructured documents and structured documents. FIG. 3 shows an example page of an unstructured document that is in the form of an example PDF document 300. As shown in the FIG. 3, the unstructured document can include, paragraphs, sentences, captions, images, tables, lists, a header and a footer, although the unstructured document provides no innate computer-readable delineation of these elements, as they are all presented as part of a single one page image. In contrast, FIG. 4 shows an example of a portion of a structured document in the form of an XML document that has a hierarchical structure (i.e., a tree structure) of elements and sub-elements, in which each element is labeled. For example, various tags or labels such as "table-wrap", "label", "caption" and "tbody" provide the structure and labels for portions of a table (i.e., the same "Table 3" that is shown in FIG. 3) that is represented by the XML document. As shown in FIG. 4, other document elements such as paragraphs can be represented by the label "<p>", titles can be represented by the label "<title>", a list can be represented by the label "<list>" and so on. It will be understood that the examples shown in FIGS. 3 and 4 are for illustration purposes only, and different types of structured and/or unstructured documents may be utilized, and different forms of hierarchical structures and/or labeling formats can be used by structured documents.

As shown at block 204, the method includes standardizing (e.g., via processing system 100) the tree structure/hierarchical nodes of the structured documents. In some cases, different XML, documents (or other type of structured document) can have slightly different formats or schemas that can be modified by the processing system to normalize the formatting/schema style to be the same of the same type/standard. For example, in some XML documents, the tables and/or figures are embedded in the main text whereas in other XML documents the tables and/or figures are placed at the end of the XML document, and so processing system 100 may reformat some of the XML documents (e.g., move tables/figures from being embedded in the text to being placed at the end of the XML document) so that all of the XML documents have been normalized to a single format. Similarly, there can be different definitions of an "abstract" among different XML documents, where some XML documents may use the term "abstract" as referring to highlights of the paper in addition to or separately from what is generally considered to be a formal abstract of a paper. Thus, in some embodiments of the invention, the processing system may normalize the XML documents so that each "abstract" label refers to only the formal abstract of the document (e.g., by changing uses of "abstract" to refer to highlights of the paper to a "paragraph" or "list" label). Such normalization of the tree structure allows the matching algorithm (described below) to be uniformly applied to all structured documents.

According to some embodiments, not all types of nodes of a structured document will be considered for matching to portions of the unstructured document. Thus, in some embodiments, standardizing the tree structure/nodes of the structured document can include removing specified types of nodes from the document. For example, in an XML document, node types such as "tex-math", "edition", "institution-id", and "disp-formula" may not be considered for matching purposes and may therefore be removed.

In some embodiments, standardizing the tree structure can further include splitting the nodes of an XML document into five groups: Sorted (including paper title, abstract, keywords, section titles, and text in main text), Unsorted (including copyright statement, license, authors, affiliations, acknowledgements, and abbreviations), Figures (including caption label (e.g., "FIG. 1"), caption text, and figure body (i.e., image)), Tables (including caption label (e.g., "Table 1"), caption text, footnotes and table body) and Lists (including lists). The order of sorted XML nodes will match the reading order in the PDF document and the order of the unsorted XML nodes may not match the reading order in the PDF document.

As shown at block 206, the method includes performing (e.g., via the processing system 100) string pre-processing to normalize the formatting of strings (e.g., Unicode normalization) to reduce discrepancies between documents. As will be appreciated by those of skill in the art, the strings in the XML and parsed PDF documents are Unicode strings. In Unicode, several characters can be expressed in various ways. Therefore, to make the matching between the XML and parsed PDF documents (described further below) more robust, the processing system 100 can normalize Unicode strings to, for example, the KD normal form (i.e., by replacing all compatibility characters with their equivalents).

Figure 5:
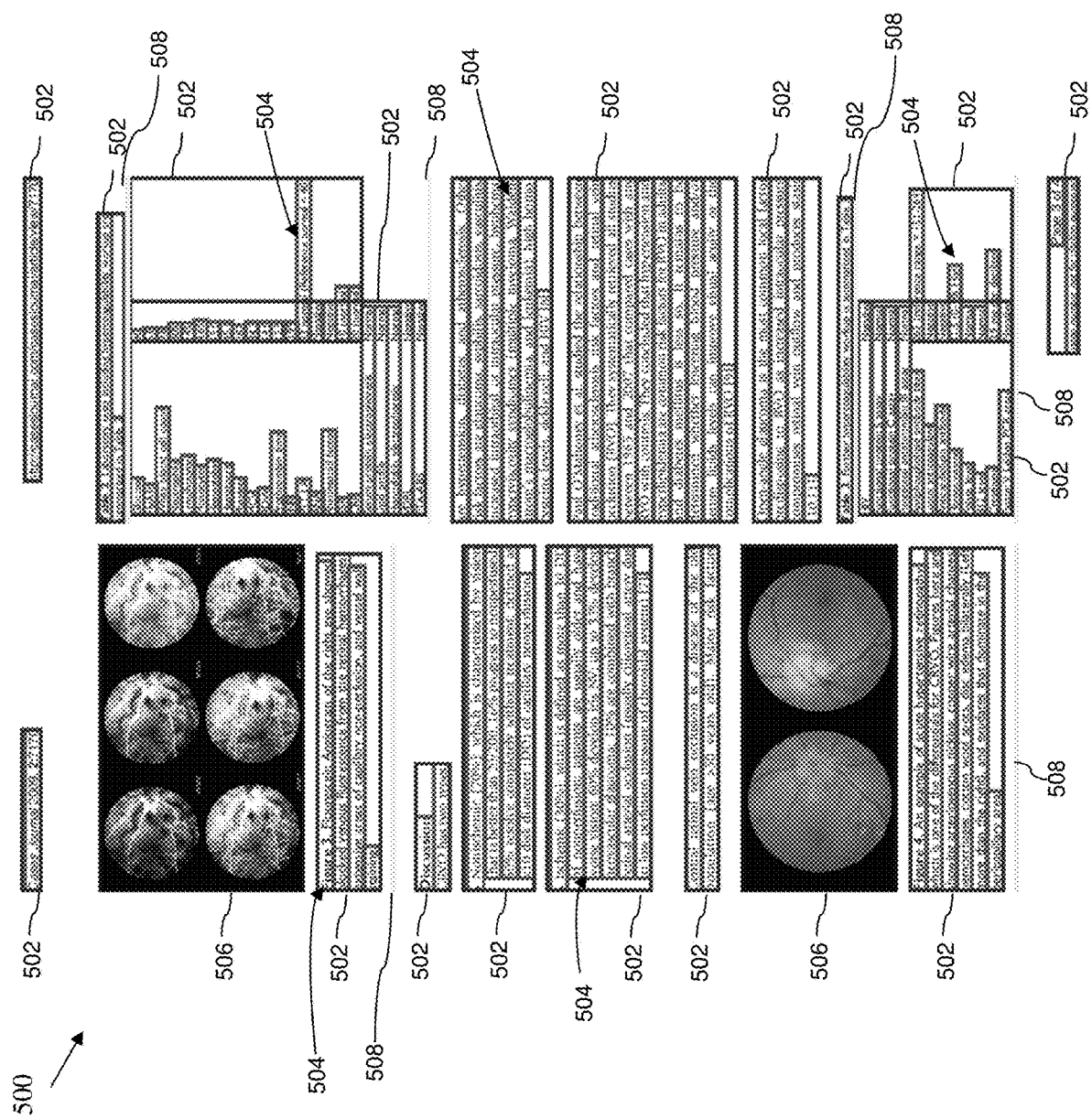
FIG. 5 depicts an example unstructured document that has been parsed by a parsing tool according to one or more embodiments of the present invention.
Figure 6:
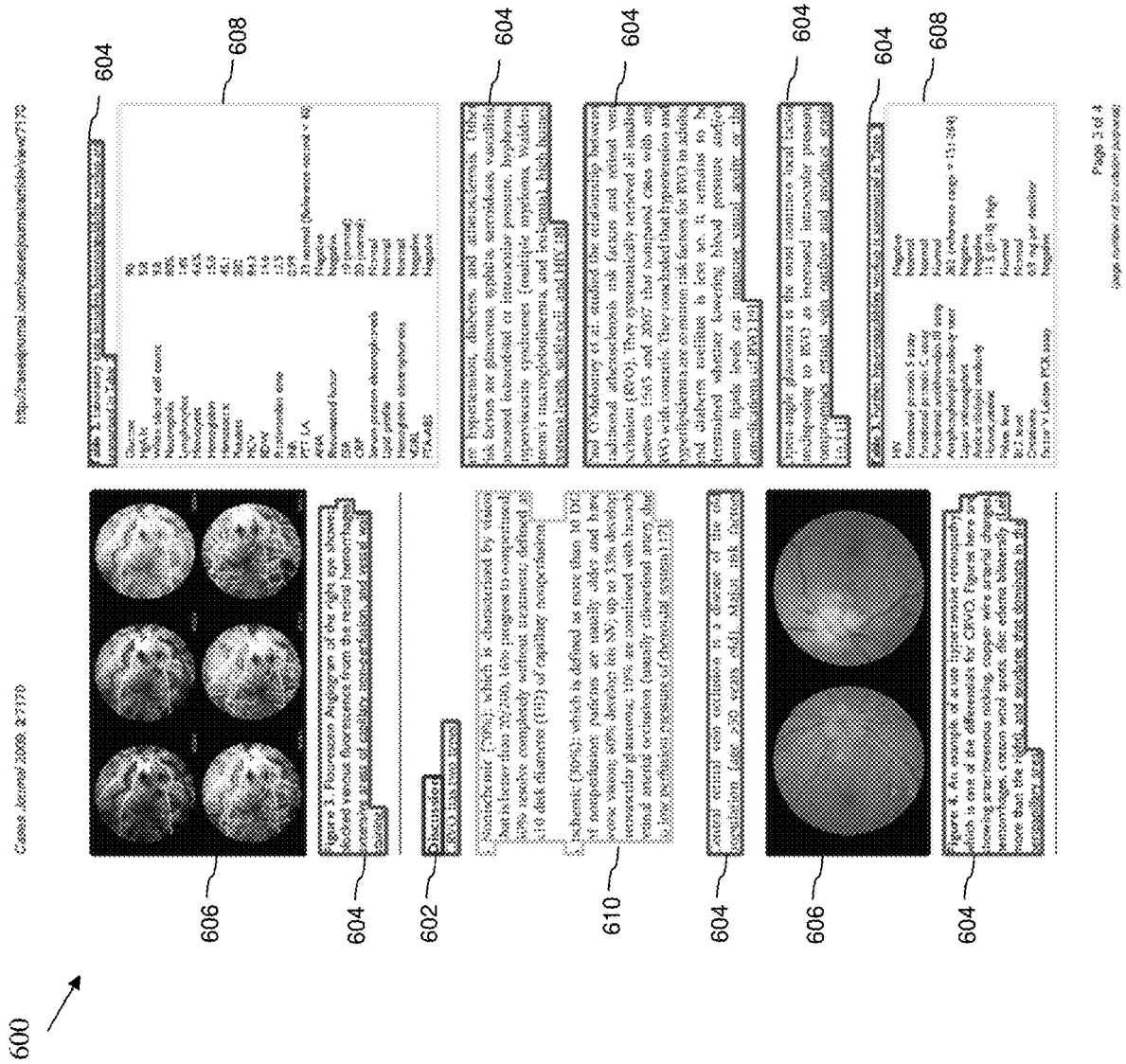
FIG. 6 depicts an example unstructured document that has been annotated and segmented according to one or more embodiments of the present invention.

As shown at block 208, the method includes parsing (e.g., via processing system 100) the unstructured documents to generate parsed unstructured documents. In some embodiments of the invention, the unstructured document parsing engine 106 can include a parsing tool (e.g., PDFMiner) that can automatically parse an unstructured document. For example, in some embodiments, the unstructured document parsing engine 106 can apply a parsing tool to a PDF, such as the example PDF document 300 (i.e., the unstructured document) shown in FIG. 3, to automatically generate a parsed PDF, such as the example parsed PDF 500 shown in FIG. 5. As will be appreciated by those of skill in the art, pre-existing parsing tools such as PDFMiner, can analyze a PDF document and extract (1) blocks of text that include one or more textlines, (2) images and (3) geometric shapes. According to some embodiments, each extracted textbox has three attributes that include the text in the textbox, the bounding box of the textbox, and texlines of the textbox. For example, the example parsed PDF 500 shows multiple extracted textboxes 502, each having one or more textlines 504 (not all textlines in FIG. 6 are labeled). In some embodiments of the invention, each textline can have two attributes that include the text in the textline and the bounding box of the textline. According to some embodiments, the bounding box of a textbox 502 or textline 504 refers to the rectangular box around a block of text that defines a region of the PDF page that is generally occupied by the textbox 502 or textline 504, respectively. As will be appreciated by those of skill in the art, the parsing tool can obtain the text of a textbox using, for example, known optical character recognition (OCR) techniques. Similarly, the images 506 extracted by the parsing tool are also associated with respective bounding boxes. According to some embodiments, the parsing tool can also extract lines, curves, and rectangles, which often appear in tables and vector figures. They are extracted to find the bounding box of tables and figures (i.e., a minimum box that encloses all text, images, lines, curves, and rectangles in the table/figure). These objects can be referred to as geometric shapes 508, each of which is associated with a respective bounding box. Thus, according to some embodiments of the invention, a parsed PDF document can include various bounding boxes defining regions/portions of a page of the PDF document that are occupied by a textbox, a textline, an image and/or a geometric shape.

As shown at block 210, the method includes performing (e.g., via processing device 100) string pre-processing on the extracted text of the parsed unstructured document (e.g., parsed PDF) in a manner similar to that described above with respect to block 206 to normalize Unicode strings to allow for more robust text matching between the parsed unstructured documents and the structured documents.

As shown at block 212, the method includes applying (e.g., via processing device 100) a matching tool to each pair of structured and parsed unstructured documents to identify portions of the unstructured document that correspond to labeled portions of the structured document in order to generate annotations (i.e., labeled regions that identify the type of object/element that is disposed in the region) for the unstructured document. FIG. 6 shows an example annotated PDF document 600 (i.e., an annotated unstructured document) that can result from the matching, annotation and segmentation processes described herein and that can ultimately be used as training data to train a machine learning model to identify elements/objects of newly presented PDFs. As shown by FIG. 6, the annotated PDF document 600 is the example PDF document 300 that has now been annotated with boundaries and associated labels that classify objects/elements of the page, such as a title 602, blocks of text 604, figures/images 606, tables 608 and a list 610. These labeled regions of the annotated PDF document 600 are generated by the processing system 100 determining that the content of these regions match corresponding labeled portions of the corresponding structured document (e.g., XML document), and assigning the corresponding label to the respective region of the example PDF document 300. The boundaries of each region can be made to be more precise by applying the segmentation process described below.

According to some embodiments, the object matching engine 108 can execute one or more matching algorithms that match labeled portions of the corresponding structured document to a bounded region of the parsed unstructured document. According to some embodiments of the invention, the one or more matching algorithms can compare a paragraph of the structured document to each textline of the parsed unstructured document to identify a text match. There can be frequent minor discrepancies between the content of a PDF parsed by a parsing tool and the text of an XML nodes. Thus, in some embodiments, the object matching engine 108 can perform text matching using a fu12y string matching algorithm, which is designed to tolerant minor discrepancies. For example, in some embodiments, the object matching engine 108 can search for the closet match to a target string in a source string, where string distance is measured by the Levenshtein distance. In such embodiments, the maximum distance allowed for a match ($d_{max}$) is adaptive to the length of the target string ($l_{target}$) as, $$d\max = \begin{cases} 0.2 * I_{target} & \text{if } I_{target} \leq 20 \\ 0.15 * I_{target} & \text{if } 20 < I_{target} \leq 40 \\ 0.1 * I_{target} & \text{if } I_{target} > 40 \end{cases}$$

As one textbox may cover multiple XML, nodes, in some embodiments, the object matching engine 108 can sequentially search the textlines of a textbox in the text of an XML node. If the textline of the textbox cannot be found in the text of the XML node, then the object matching engine 108 can skip to the next textbox of the parsed PDF document and sequentially search each textline of that textbox in the XML node. If the end of an XML node is reached, but the textline is not the end of the textbox, the textbox can be divided into two textboxes at the current textline. Then the former textbox can be appended to the list of matched textboxes of the XML node. When all the content of the XML node is covered by matching textlines, the object matching engine 108 can begin searching the next XML node. This text matching procedure can be applied to all of the text XML nodes, including the "Sorted", "Unsorted", and "Lists" groups, the captions in the "Tables" and "Figures" groups; and the footnotes in the "Table" group.

Depending on the template of specific journals/publications, section/subsection titles may be inline with the first paragraph in the section. A title can be treated as inline titles if the last line of the title does not cover a whole textline. According to some embodiments, inline section titles can be annotated as part of the text, rather than individual instance of titles. The same principle can also be applied to the caption labels of figures and tables.

Figure 7:
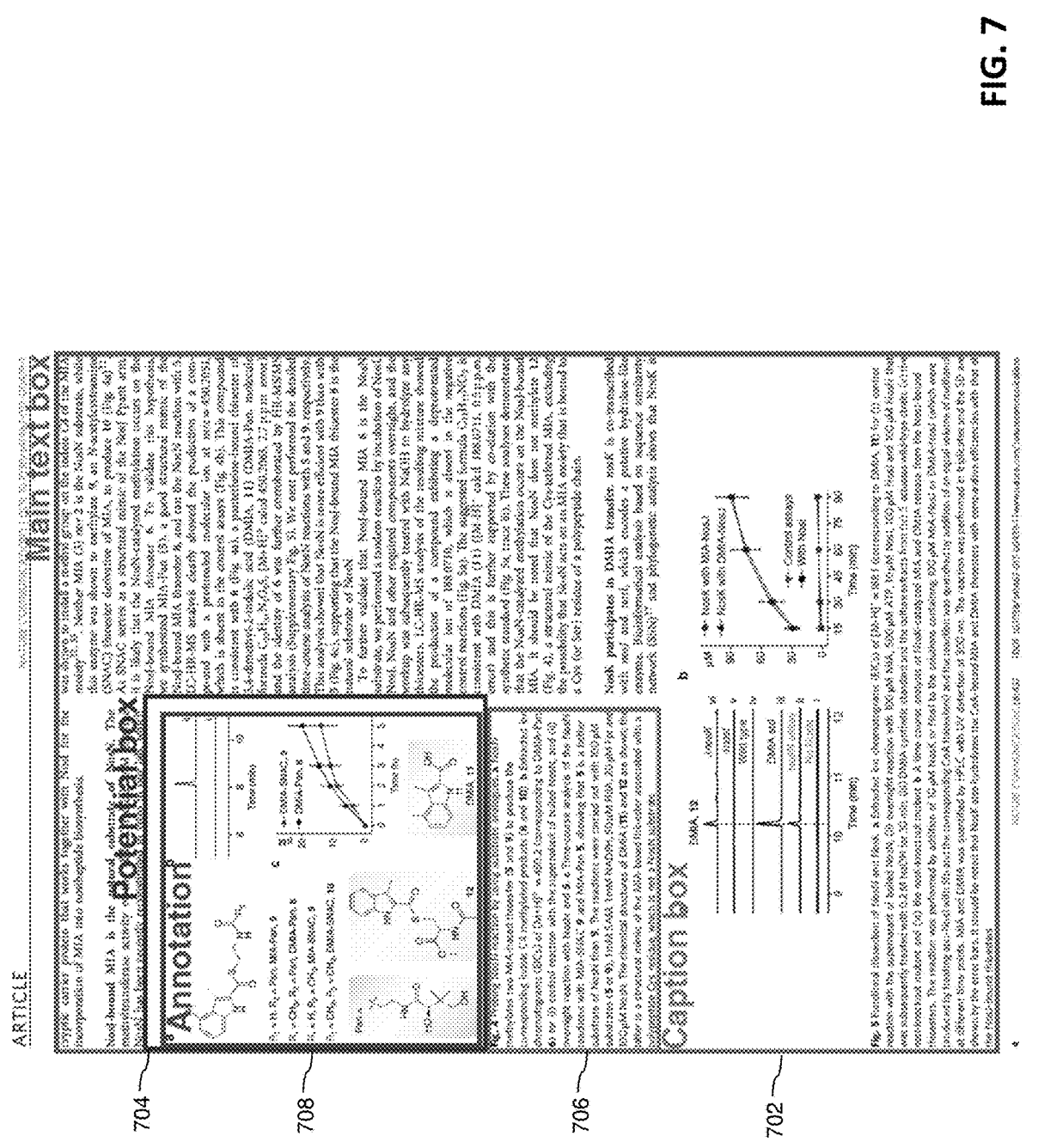

According to some embodiments, after all of the text XML nodes are processed, the margin between the annotated text elements in the PDF page can be utilized to annotate the body of figures (i.e., images) and tables (e.g., via object annotation engine 110). FIG. 7 illustrates an example of the annotation process for a figure body that can be executed by the object annotation engine 110. First, the bounding box of the main text box 702 of the article is obtained as the smallest bounding box that encloses all the annotated text elements in the article. Then the potential box 704 for the figure can be calculated as the largest box that can be fit in the margin between the top of the caption box 706 and the annotated text elements above the caption. Then, the figure body can be annotated with an annotation box 708 that is the smallest box that encloses all of the textboxes, images, and geometric shapes within the potential box 704. According to some embodiments, table bodies can be annotated using the same process, where it is assumed that table bodies are always below the caption of the tables.

Figure 8:
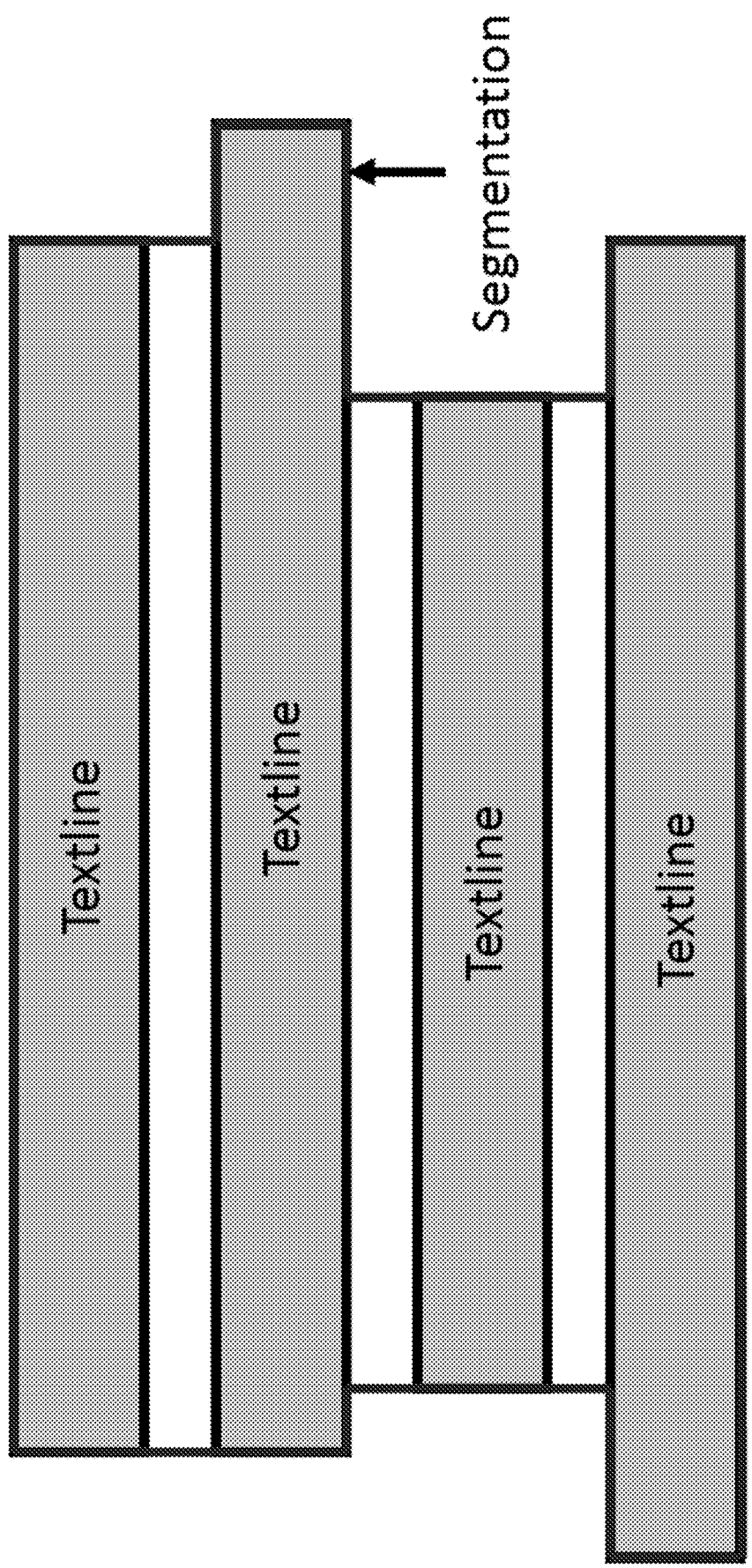
FIG. 8 depicts an example layout segmentation generation according to one or more embodiments of the present invention.

As shown at block 214, the method includes generating (e.g., via processing device 100) segmentations of annotated regions. According to some embodiments, the segmentation engine 112 can generate instance segmentations to more precisely define the boundaries of labeled objects in the annotated PDF document. In some embodiments, for text, title and list instances, the segmentation engine 112 can automatically generate segmentations from the textlines of the parsed PDF objects. For example, as shown in FIG. 8, the top edge of the top textline and the bottom edge of the bottom textline in the parsed PDF object can form the top and bottom edge of the segmentation, respectively. The right edges of the textlines can be scanned from top to bottom to form the right side of the segmentation and the left edges of the textlines can be scanned from bottom to top to form the left side of the segmentation, such that the horizontal locations of the vertical edges are dictated by the left and right edges of each textline as shown in FIG. 8 to form a polygonal shape having only right angles. According to some embodiments, for figure and table instances, the bounding boxes created as previously described above can be reused as the segmentation, as almost all of these instances are already rectangular. As will be appreciated by those of skill in the art, depending on the model to be trained, the bounding boxes, segmentations, or both are used in the training process. For example, for object detection models such as Faster-RCNN (Recurrent Convolutional Neural Network), only the bounding boxes are required in training. For semantic segmentation models such as Fully-connected CNN (Convolutional Neural Network), only the segmentations are used in training. For instance segmentation models such as Mask-RCNN, both the bounding boxes and the segmentations are needed to train the model.

As shown at block 216, the method includes automatically performing (e.g., via processing device 100) quality control of the annotated unstructured documents. There are various sources that can lead to discrepancies between the PDF parsing results and the corresponding XML document. According to some embodiments, when discrepancies are over a predetermined threshold (e.g., $d_{max}$), the object matching engine 108 and/or object annotation engine 110 may not be able to identify all elements/objects on a page of the PDF. For example, the parsing tool may parse some complex inline formulas completely differently from the XML document, which leads to a large Levenshtein distance and a failure to match PDF objects with XML nodes. Thus, it is desirable to remove poorly annotated pages from being stored/used as part of the automatically generated training data. According to some embodiments, the annotation quality of a PDF (or other unstructured document) can be defined as the ratio of the area of textboxes, images, and geometric shapes that are annotated to the area of textboxes, images and geometric shapes within the main text box of the page. The main text box can be considered to be the rectangular area inside the margins of the page that contains the majority of the text of the page (e.g., in some embodiments, page numbers, headers and footers are not considered part of the main text box). According to some embodiments, the processing device 100 can exclude non-title pages that have an annotation quality of less than a predetermined annotation quality threshold from being stored as part of the automatically generated training data. According to some embodiments, the predetermined annotation quality threshold can be 99%, although it will be understood that this threshold may be set to be any user-defined percentage. As the formatting of title pages can vary greatly and can include various different elements and information (e.g., manuscript history, copyright statement, editorial details, etc.), a second different annotation quality threshold can be applied to title pages.

As shown at block 218, the method includes storing (e.g., via processing device) the annotated unstructured documents as a training data for use by a machine learning model. According to some embodiments, storing the annotated unstructured documents can include storing the bounding boxes, segmentations and respective labels in association with each unstructured document so that a machine learning model using the annotated unstructured documents as training data for a model that can identify document elements/objects will know which regions of a given unstructured document are text, titles, images/figures, tables, lists, and the like.

According to some embodiments, the method 200 can include providing the annotated unstructured documents to a machine learning model to train the model to automatically identify document elements of new unstructured documents. In other words, in some embodiments, method 200 can further include training a machine learning model using the annotated unstructured documents to identify objects/elements (e.g., such as paragraphs, images, tables, lists, and other such objects described herein) within a new (i.e., not previously labeled) unstructured document such as a new PDF document. The trained model can receive a new unstructured document as an input and output a labeled document in which the objects/elements of the document have been identified and labeled (e.g., as metadata associated with the output document).

Figure 9:
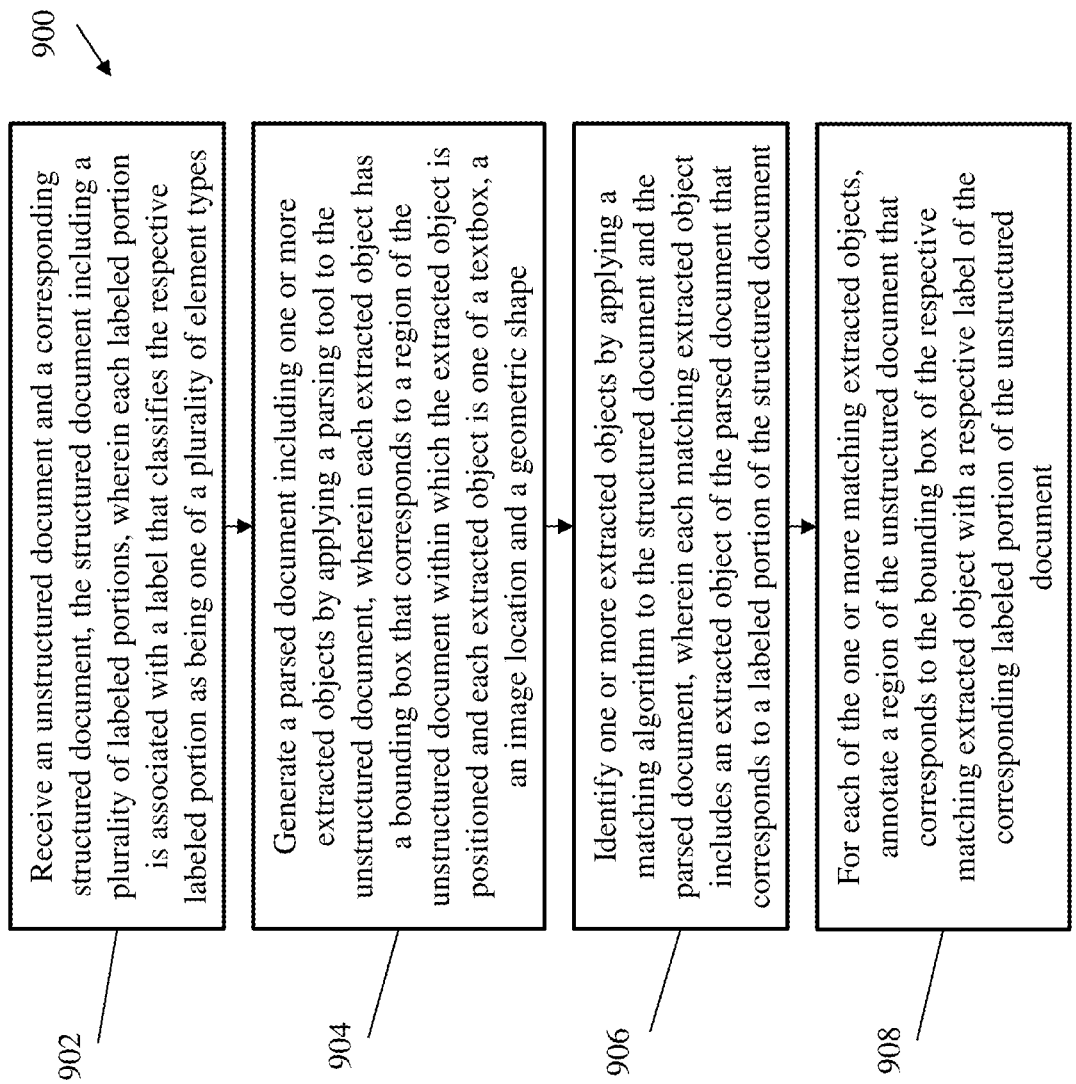
FIG. 9 illustrates a flow diagram for a process of automated generation of structured training data based on an unstructured document in accordance with one or more embodiments of the present invention.

Turning now to FIG. 9, a flow diagram of a method 900 for providing automated generation of structured training data based on an unstructured document in accordance with an embodiment is shown. In one or more embodiments of the present invention, the method 900 may be embodied in software that is executed by processing system 100 and/or computer elements located within a network that may reside in the cloud, such as the cloud computing environment 50 described herein above and illustrated in FIGS. 10 and 11. In other embodiments, the computer elements may reside on a computer system or processing system, such as the processing system 1200 described herein above and illustrated in FIG. 12, or in some other type of computing or processing environment.

The method 900 begins at block 902 and includes receiving (e.g., via processing device 100) an unstructured document and a corresponding structured document. According to some embodiments, the structured document can be one of an Extensible Markup Language (XML) file, LaTeX code, JSON file, or a Hypertext Markup Language (HTML) document and the unstructured document can be a Portable Document Format (PDF) or plain text. The structured document includes a plurality of labeled portions, such as labeled nodes of a tree structure in an XML document. Each labeled portion is associated with a label that classifies the respective labeled portion as being one of a plurality of element types. In some embodiments, the plurality of element types can include one or more text, a title, an image (or figure), a table, a list, an abstract, a header, a footer, or any other such type of object or element of a document. According to some embodiments the unstructured document can include a plurality of pages, such as for example, a multi-page publication.

As shown at block 904, the method includes generating (e.g., via processing device 100) a parsed document by applying a parsing tool to the unstructured document. According to some embodiments, a parsing tool can be a known, open source tool, such as for example, PDFMiner. The parsed document generated by the parsing tool can include one or more extracted objects that are extracted by the parsing tool from the unstructured document according to known techniques such as optical character recognition (OCR) and heuristics of spatial relationships (e.g., horizontal and vertical distance between characters). For example, PDFMiner can first extract the location of each character in the PDF file, then can use adaptive thresholds on the horizontal and vertical distance between characters to determine higher-level objects such as textlines and textboxes. According to some embodiments, the minimum box that encloses all the characters in a high-level object form the bounding box covered by the object on the page of the document. In some embodiments, each extracted object has a bounding box (as determined by the parsing tool) that corresponds to a region of the unstructured document within which the extracted object is positioned. According to some embodiments, each bounding box can be rectangular and can approximate the area covered by the extracted object on the page of the document. According to some embodiments, each extracted object can be one of a textbox (that includes textlines having extracted text), an image location, or a geometric shape.

As shown at block 906, the method includes identifying (e.g., via processing device 100) one or more matching extracted objects by applying a matching algorithm to the structured document and the parsed document. Each matching extracted object includes an extracted object of the parsed document that corresponds to a labeled portion of the structured document. For example, a matching extracted object could be a paragraph of text present in the text of the parsed document that matches text in a labeled node of the structured document. Based on the match, the position of the bounding box corresponding to the text in the parsed document, and the relative position of the matching text in the node of the structured document, the processing device 100 can determine which regions of the original unstructured document correspond to the labeled regions (e.g., sequential nodes) of the structured document. According to some embodiments, the object matching engine 108 can first determine regions of the unstructured document that contain matching text, and then based on the remaining unlabeled regions and corresponding labeled node sequences in the structured document can determine the regions occupied by other objects such as tables and figures. For example, if in an XML document, a sequence of nodes/objects are Text-1, Table-1, Caption-1, and Text-2, and the object matching engine 108 matches the text of each of Text-1, Caption-1 and Text-2 to portions of a parsed PDF (which each correspond to bounding boxes that mark off regions of the PDF) that can therefore be annotated with "text", "caption" and "text" labels respectively, the object matching engine 108 can determine that an unlabeled region between a region labeled as "text" (corresponding to the content of "Text-1") and a region labeled as "caption" (corresponding to the content of "Caption-1") can be assumed to correspond to the content of "Table-1". Therefore the system can annotate the PDF to label the bounding box that corresponds to that table as being labeled as a "table."

According to some embodiments, identifying one or more extracted objects can include identifying a matching paragraph by applying a fuzzy string matching algorithm to a comparison of text of at least one portion of the structured document that is labeled with a paragraph label to text of at least one extracted object that is a line of text or a paragraph node in the parsed document to identify an amount of matching text that exceeds a predetermined threshold. For example, in some embodiments, a target string can be compared to a source string and a degree of match can be determined and compared to a required threshold level of matching. For example, in some embodiments, a target string is not considered to match a source string if the Levenshtein distance between the two exceeds a predetermined threshold. According to some embodiments, the predetermined threshold of the Levenshtein distance can be a function of the length of the target string.

In some embodiments, identifying one or more extracted objects can include identifying an image or table using a heuristic rule. For example, the heuristic rule can include identifying an unlabeled region of the unstructured document, identifying an adjacent (to the unlabeled region) line of text based on the parsed document, and responsive to determining that a corresponding line of text of the structured document matches the adjacent line of text, determining that the unlabeled region corresponds to an image or table based on a label associated with an image or table of the structured document that is proximate the corresponding line of text within the structured document. The unlabeled region is a region of the unstructured document that has not been annotated with a label and the adjacent line of text being disposed adjacent to the unlabeled region. In other words, as previously described above, the positions of images (i.e., figures) and tables within, for example, a PDF document can be inferred based on the surrounding blocks of text that have been positively matched when compared to the sequence of objects found in an XML document (based on the locations of the matching text relative to the proximate locations of labeled images and/or tables).

As shown at block 908, the method includes for each of the one or more matching extracted objects, annotating (e.g., via processing device 100) a region of the unstructured document that corresponds to the bounding box of the respective matching extracted object with a respective label of the corresponding labeled portion of the unstructured document. In other words, after a portion of the unstructured document is matched to a portion of the labeled structured document (by way of comparison to the parsed unstructured document), the system can annotate the region of the unstructured document corresponding to the bounding box of the matching extracted object to have the label of the matching portion of the structured document. Thus, for example, if the text of a node of an XML document that is labeled as "text" matches a portion of a parsed PDF, the bounding box corresponding to that portion of the parsed PDF will be labeled as "text" (e.g., an association with an area of the bounding box that is superimposed over the original PDF document).

According to some embodiments, the method 900 can further include for each annotated region of the unstructured document, generating a polygonal segmentation of the annotated region based on a shape of a matching extracted object that corresponds to the annotated region. For example, as previously described above with respect to FIG. 8, generating segmentation instances can provide a more precise approximation of the region occupied by the annotated object. In other words, the bounding box can generally identify the region occupied by the annotated object, whereas the segmentation of the object is a smaller polygonal area within the bounding box that more tightly borders the labeled object (as illustrated in FIG. 8).

As described previously above, in some embodiments, generating a parsed document can further include generating, for each region of the unstructured document, a bounding box defining the region (e.g., by operation of a parsing tool using known techniques). The method 900 can further include, for each annotated region of the unstructured document, storing, as part of a set of training data, the corresponding bounding box, label and polygonal segmentation associated with the annotated region. In other words, the training data that is automatically generated by the processes described herein can be stored as the original document (e.g., the original PDF document) with associated metadata the indicates the locations of bounding boxes and segmentations of objects, along with the labels of the objects, so that a machine learning model that uses the document as training data will know the objects contained within each page and what region of the page each object is located to facilitate the training of a model that can recognize document objects/elements in new documents.

According to some embodiments, the method 900 can further include for each page of the plurality of pages, determining a percentage of a total area of the page that comprises annotated regions and responsive to determining that the percentage fails to exceed a predetermined threshold percentage, excluding annotation data associated with the page from being stored as part of the set of training data. In other words, as a quality control measure, pages that are not substantially completely labeled can be discarded and not included in the set of training data.

In some embodiments, the method 900 can further include performing pre-processing on the parsed document and/or structured document to normalize formatting between the parsed document and the structured document to facilitate more robust matching between documents.

Additional processes may also be included. It should be understood that the processes depicted in FIGS. 2 and 9 represent illustrations, and that other processes may be added or existing processes may be removed, modified, or rearranged without departing from the scope and spirit of the present disclosure.

Figure 10:
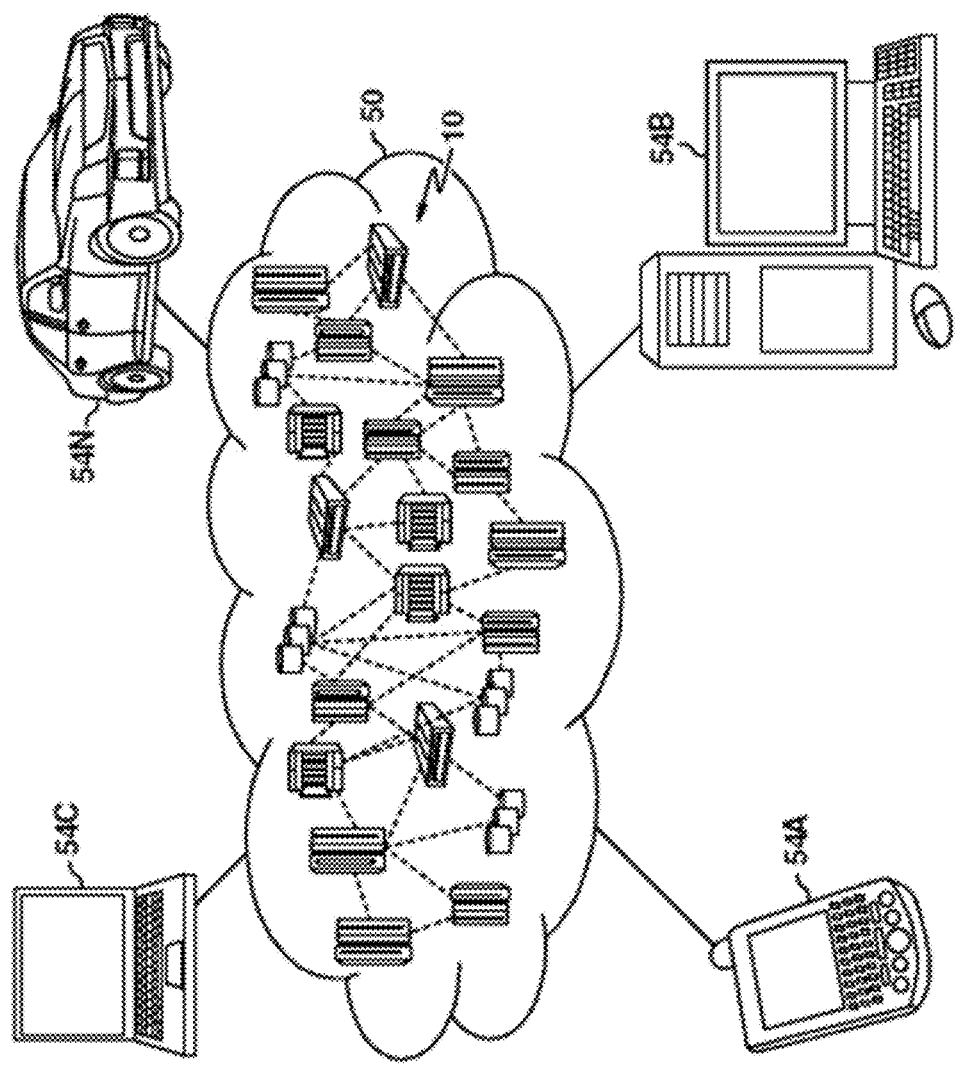
FIG. 10 illustrates a cloud computing environment according to one or more embodiments of the present invention.
Figure 11:
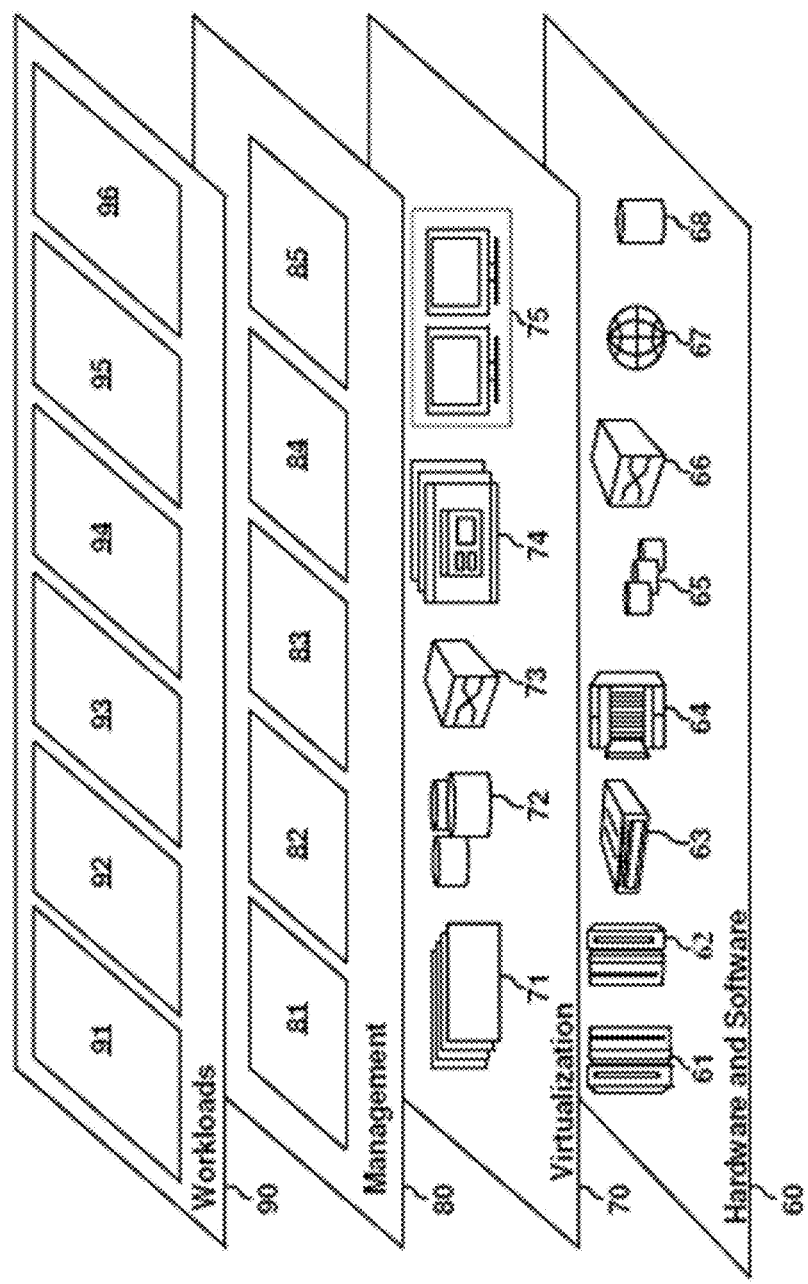
FIG. 11 illustrates abstraction model layers according to one or more embodiments of the present invention.

FIG. 10 depicts a cloud computing environment according to one or more embodiments of the present invention. FIG. 11 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated generation of structured training data from unstructured documents 96.

Figure 12:
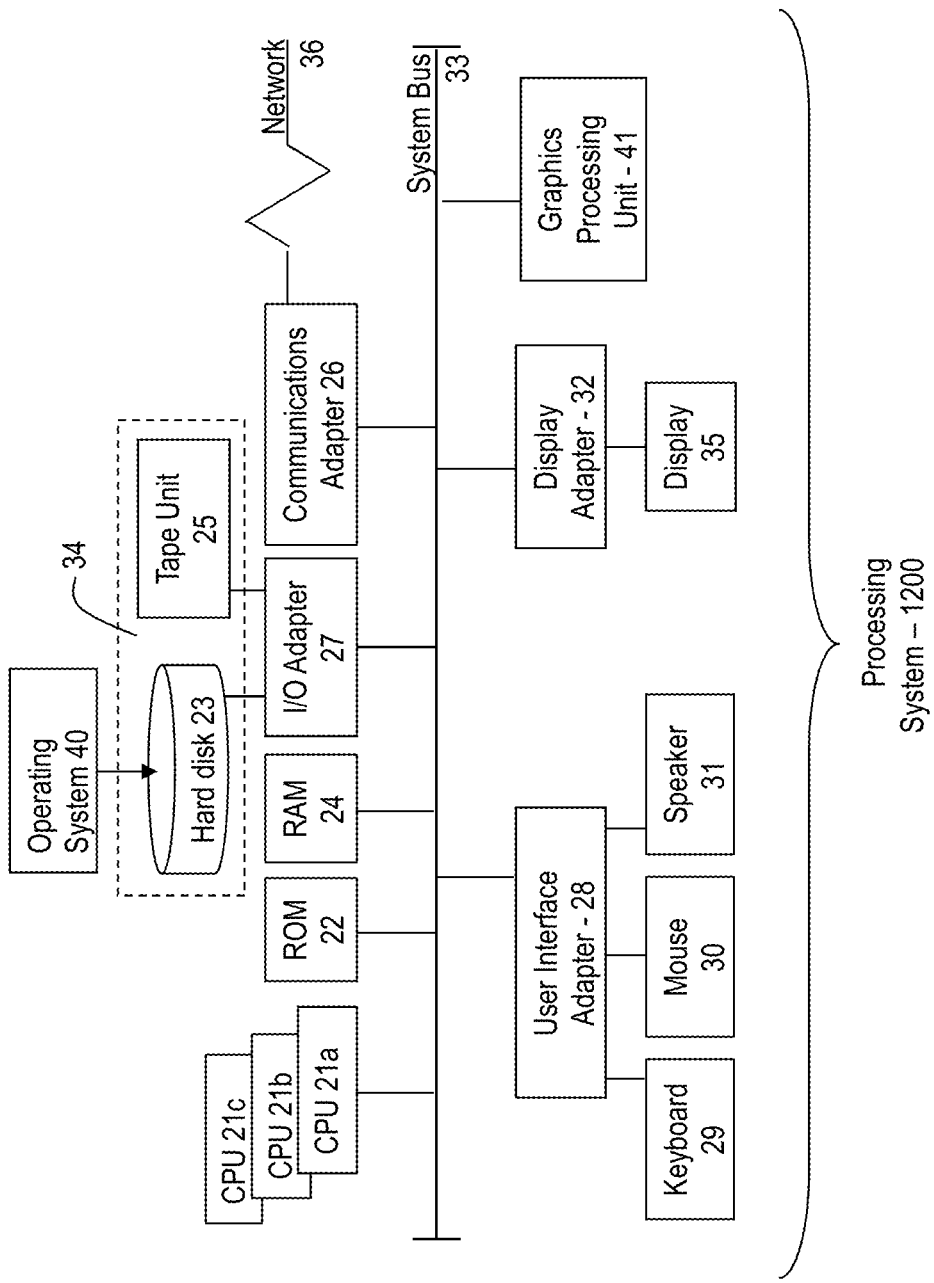
FIG. 12 illustrates a block diagram of a computer system for use in implementing one or more embodiments of the present invention.

FIG. 12 depicts a processing system for implementing one or more embodiments of the present invention;

It is understood that one or more embodiments of the present invention are capable of being implemented in conjunction with any other type of computing environment now known or later developed. For example, FIG. 12 depicts a block diagram of a processing system 1200 for implementing the techniques described herein. In accordance with one or more embodiments of the present invention, processing system 100 and/or system 1200 can be an example of a cloud computing node 10 of FIG. 10. In the embodiment shown in FIG. 12, processing system 1200 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 1200.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 1200 can be stored in mass storage 34. The RAM 24, ROM 22, and mass storage 34 are examples of memory 19 of the processing system 1200. A network adapter 26 interconnects system bus 33 with an outside network 36 enabling the processing system 1200 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 1200 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 1200 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 1200.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, using a processor, an unstructured document and a corresponding structured document, the structured document comprising a plurality of labeled portions, wherein each labeled portion is associated with a label that classifies the respective labeled portion as being one of a plurality of element types;
   generating, using the processor and by applying a parsing tool to the unstructured document, a parsed document comprising one or more extracted objects, wherein each extracted object has a bounding box that corresponds to a region of the unstructured document within which the extracted object is positioned and each extracted object comprises one of a textbox, an image location and a geometric shape;
   identifying, using the processor and by applying a matching algorithm to the structured document and the parsed document, one or more matching extracted objects, wherein each matching extracted object comprises an extracted object of the parsed document that corresponds to a labeled portion of the structured document;
   for each of the one or more matching extracted objects, annotating, using the processor, a region of the unstructured document that corresponds to the bounding box of the respective matching extracted object with a respective label of the corresponding labeled portion of the unstructured document; and
   storing, as part of a set of training data, the corresponding bounding box, label and polygonal segmentation associated with the annotated region.

2. The computer-implemented method of claim 1 further comprising for each annotated region of the unstructured document, generating the polygonal segmentation of the annotated region based on a shape of a matching extracted object that corresponds to the annotated region.

3. The computer-implemented method of claim 2, wherein generating a parsed document further comprises generating, for each region of the unstructured document, a bounding box defining the region, the method further comprising for each annotated region of the unstructured document.

4. The computer-implemented method of claim 3, wherein the unstructured document comprises a plurality of pages, the method further comprising:
   for each page of the plurality of pages, determining a percentage of a total area of the page that comprises annotated regions; and
   responsive to determining that the percentage fails to exceed a predetermined threshold percentage, excluding annotation data associated with the page from being stored as part of the set of training data.

5. The computer-implemented method of claim 1, wherein the plurality of element types comprises one or more of text, a title, a figure, a table, a list, an abstract, a header and a footer.

6. The computer-implemented method of claim 1 further comprising performing pre-processing on the parsed document and/or structured document to normalize formatting between the parsed document and the structured document.

7. The computer-implemented method of claim 1, wherein the unstructured document is a Portable Document Format (PDF).

8. The computer-implemented method of claim 1, wherein the structured document is an Extensible Markup Language (XML) file, LaTeX code or a Hypertext Markup Language (HTML) document.

9. The computer-implemented method of claim 5, wherein identifying one or more extracted objects comprises identifying a matching paragraph by applying a fu1 2y string matching algorithm to a comparison of text of at least one portion of the structured document that is labeled with a paragraph label to text of at least one extracted object that is a line of text or a paragraph node in the parsed document to identify an amount of matching text that exceeds a predetermined threshold.

10. The computer-implemented method of claim 1, wherein identifying one or more extracted objects comprises identifying an image or table using a heuristic rule, wherein the heuristic rule comprises:

identifying an unlabeled region of the unstructured document, wherein the unlabeled region comprises a region of the unstructured document that has not been annotated with a label;

identifying, based on the parsed document, an adjacent line of text, the adjacent line of text being disposed adjacent to the unlabeled region, responsive to determining that the a corresponding line of text of the structured document matches the adjacent line of text, determining that the unlabeled region corresponds to an image or table based on a label associated with an image or table of the structured document that is proximate the corresponding line of text within the structured document.

11. A system comprising:

a memory having computer readable instructions; and one or more processors for executing the computer readable instructions, the computer readable instructions controlling the one or more processors to perform operations comprising:

receiving an unstructured document and a corresponding structured document, the structured document comprising a plurality of labeled portions, wherein each labeled portion is associated with a label that classifies the respective labeled portion as being one of a plurality of element types;

generating, by applying a parsing tool to the unstructured document, a parsed document comprising one or more extracted objects, wherein each extracted object has a bounding box that corresponds to a region of the unstructured document within which the extracted object is positioned and each extracted object comprises one of a textbox, an image location and a geometric shape;

identifying, by applying a matching algorithm to the structured document and the parsed document, one or more matching extracted objects, wherein each matching extracted object comprises an extracted object of the parsed document that corresponds to a labeled portion of the structured document;

for each of the one or more matching extracted objects, annotating a region of the unstructured document that corresponds to the bounding box of the respective matching extracted object with a respective label of the corresponding labeled portion of the unstructured document; and storing, as part of a set of training data, the corresponding bounding box, label and polygonal segmentation associated with the annotated region.

12. The system of claim 11 further comprising for each annotated region of the unstructured document, generating the polygonal segmentation of the annotated region based on a shape of a matching extracted object that corresponds to the annotated region.

13. The system of claim 12, wherein generating a parsed document further comprises generating, for each region of the unstructured document, a bounding box defining the region, the method further comprising for each annotated region of the unstructured document.

14. The system of claim 13, wherein the unstructured document comprises a plurality of pages, the method further comprising:

for each page of the plurality of pages, determining a percentage of a total area of the page that comprises annotated regions; and responsive to determining that the percentage fails to exceed a predetermined threshold percentage, excluding annotation data associated with the page from being stored as part of the set of training data.

15. The system of claim 11, wherein the plurality of element types comprises one or more of text, a title, a figure, a table, a list, an abstract, a header and a footer.

16. The system of claim 11 further comprising performing pre-processing on the parsed document and/or structured document to normalize formatting between the parsed document and the structured document.

17. A computer program product comprising a computer readable non-transitory storage medium having program instructions embodied therewith, the program instructions executable by a computer processor to cause the computer processor to perform a method comprising:

receiving an unstructured document and a corresponding structured document, the structured document comprising a plurality of labeled portions, wherein each labeled portion is associated with a label that classifies the respective labeled portion as being one of a plurality of element types;

generating, by applying a parsing tool to the unstructured document, a parsed document comprising one or more extracted objects, wherein each extracted object has a bounding box that corresponds to a region of the unstructured document within which the extracted object is positioned and each extracted object comprises one of a textbox, an image location and a geometric shape;

identifying, by applying a matching algorithm to the structured document and the parsed document, one or more matching extracted objects, wherein each matching extracted object comprises an extracted object of the parsed document that corresponds to a labeled portion of the structured document;

for each of the one or more matching extracted objects, annotating a region of the unstructured document that corresponds to the bounding box of the respective matching extracted object with a respective label of the corresponding labeled portion of the unstructured document; and storing, as part of a set of training data, the corresponding bounding box, label and polygonal segmentation associated with the annotated region.

18. The computer program product of claim 17 further comprising for each annotated region of the unstructured document, generating the polygonal segmentation of the annotated region based on a shape of a matching extracted object that corresponds to the annotated region.

19. The computer program product of claim 18, wherein generating a parsed document further comprises generating, for each region of the unstructured document, a bounding box defining the region, the method further comprising for each annotated region of the unstructured document.

20. The computer program product of claim 19, wherein the unstructured document comprises a plurality of pages, the method further comprising:

for each page of the plurality of pages, determining a percentage of a total area of the page that comprises annotated regions; and responsive to determining that the percentage fails to exceed a predetermined threshold percentage, excluding annotation data associated with the page from being stored as part of the set of training data.

* * * * *